(12) United States Patent
Myono

(10) Patent No.: US 6,437,637 B2
(45) Date of Patent: Aug. 20, 2002

(54) CHARGE-PUMP CIRCUIT AND CONTROL METHOD THEREOF

(75) Inventor: Takao Myono, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/870,318

(22) Filed: May 30, 2001

(30) Foreign Application Priority Data

May 30, 2000 (JP) ........................................ 2000-159715

(51) Int. Cl.[7] .................................................. G05F 1/10
(52) U.S. Cl. ........................ 327/536; 327/534; 327/157
(58) Field of Search ................................ 327/534, 536, 327/390, 589, 157; 363/59, 60; 323/313

(56) References Cited

U.S. PATENT DOCUMENTS 5,095,223 A * 3/1992 Thomas ...................... 307/110
6,021,056 A * 2/2000 Forbes et al. .................. 363/60

FOREIGN PATENT DOCUMENTS

JP 11-348475 12/1999 ............. B42F/1/00

* cited by examiner

Primary Examiner—Tuan T. Lam
Assistant Examiner—Hiep Nguyen
(74) Attorney, Agent, or Firm—Fish & Richardson, P.C.

(57) ABSTRACT

A charge-pump circuit has means biasing electrical potential of a substrate of a MOS transistor for control M2 so that forward direction current does not flow substantially through a parasitic diode Dp1. In the concrete, the substrate of the substrate of a MOS transistor for control M2 is biased by voltage of a connecting point of the substrate of a MOS transistor for control M2 and a capacitor 1 at the case that the substrate of a MOS transistor for control M2 is P-channel type. Thus, it is prevented that a parasitic diode is biased to forward direction in a charge-pump circuit carrying out voltage fluctuation with lower voltage step than power source voltage Vdd so as to carry out normally charge-pump operation.

8 Claims, 10 Drawing Sheets

US 6,437,637 B2

CHARGE-PUMP CIRCUIT AND CONTROL METHOD THEREOF

BACKGROUND OF THE INVENTION

The present invention relates to a charge-pump circuit outputting voltage fluctuation within a step of power source voltage Vdd and a control method thereof, particularly a control method of a charge-pump circuit capable of normal charging pump operation removing influence of a parasitic diode following to a charge transfer device.

The charge-pump circuit developed by Dicson generates higher voltage than power source voltage Vdd of an LSI chip by voltage fluctuation of each pumping packet connecting plural stages of the pumping packet in series. For example, it is used for generating voltage for program/erase of flash memories.

However, the conventional charge-pump circuit carries out voltage fluctuation with a step of the power source voltage Vdd, and a circuit capable of carrying out voltage fluctuation with lower voltage step than the Vdd was not yet proposed. So, the inventor has already proposed a charge-pump circuit capable of carrying out voltage fluctuation with lower voltage step than the Vdd and improving efficiency η of the circuit (U.S. patent application Ser. No. 09/732,944 filed on Dec. 8, 2000).

The outline thereof will be described below. FIG. 17 and FIG. 18 are circuit diagrams showing a structure and an operation of −0.5 Vdd voltage fluctuation charge-pump circuit. The charge-pump circuit generates voltage of voltage fluctuation of −0.5 Vdd to earth voltage (0 V).

In FIG. 17, diodes D1 and D2 are connected in series as charge transfer devices. To a cathode of the diode D1, earth voltage (0 V) is supplied. The diodes D1 and D2 generally consist of MOS transistors for charge transfer in order to integrate into an LSI.

Switches S1, S2 and S3 connect two capacitors 1 and 2 to a connecting point between the diodes D1 and D2 switching in parallel or in series. These switches S1, S2 and S3 can consist of MOS transistors. Thus, on and off of the switches S1, S2 and S3 corresponds to on and off of the MOS transistors. A clock driver 3 supplies clock CLK to the capacitor 2. Output voltage output from the diode 2 is applied to a load 4.

An outline of control method of the charge-pump circuit will be described below. Power source voltage of Vdd the clock driver is assumed 5 V. Although forming the diodes D1 and D2 and the switches S1, S2 and S3 actually occurs voltage drop, the voltage drop is assumed 0 V omitting the voltage drop here.

When input clock of the clock driver 3 is high level (CLK=High), assuming that S1 is off, S2 is on and S3 is off, two capacitors 1 and 2 are connected in series and each node voltage is: VL1≈0V, VA=VB=2.5V, VC=5V.

VL1 is voltage of a connecting node between the diode D1 and the capacitor 1 (a pumping node), VA is voltage of a connecting node between the capacitor C1 and the switch S2, VB is voltage of a connecting node between the switch S2 and the capacitor 2, and VC is voltage of a connecting node between output of the clock driver 3 and the capacitor 2.

That is, if capacitance values which capacitors 1 and 2 have are equal, capacitors 1 and 2 are respectively charged to voltage of Vdd/2 by distributing equally electric charge to the capacitors 1 and 2 (see FIG. 17).

Next, when the input clock CLK is transferred to low level (CLK=Low) from the state of the parallel connection, each node voltage becomes: VL1≈2.5V, VA=0V, VB=−2.5V, VC=5V by effect of the capacitor coupling because the capacitors 1 and 2 are connected to the pumping node (See FIG. 18).

Thus, by repeating switching the capacitors 1 and 2 alternately to series and parallel according to the input clock CLK, output voltage of −2.5 V (=(−1/2)·Vdd) is supplied to the load 4 from the diode D2.

In order to integrate the charge-up pump of the above-mentioned structure, the switches S1, S2 and S3 consist of MOS transistors for control M1, M2 and M3 as shown in FIG. 19 and FIG. 20. To a gate of the MOS transistor for control M2, control clock $\overline{CLKs}$ is applied. To a gate of the MOS transistor for control M3, control clock $\overline{CLKp}$ is applied. When the control clock $\overline{CLKs}$ is low level, the MOS transistor for control M2 turns on and the capacitors 1 and 2 are connected in series.

When the control clock $\overline{CLKp}$ is low level, the MOS transistors for control M1 and M3 turn on and the capacitors 1 and 2 are connected in parallel. Here, it is assumed that substrates of the MOS transistors for control M1 and M2 are biased by voltage of the node B in the figure, It is assumed that a substrate of the MOS transistor for control M3 is biased by output of the clock driver 3.

As shown in FIG. 19, when the input clock CLK from the clock driver 3 is high level (CLK=High), the control clock $\overline{CLKs}$ is low level and the control clock $\overline{CLKp}$ is high level, the MOS transistors for control M1 and M2 turn off and the MOS transistors for control M2 turns on. That is, the capacitors 1 and 2 are connected in series. At this time, aiming at a parasitic PN junction diode Dp accompanying the MOS transistor for control M2, there is not any problem because the parasitic PN diode Dp is not biased to forward direction.

The parasitic PN junction diode Dp is formed between a P-type drain (node A in the figure) and an N-type substrate of the MOS transistor for control M2.

However, as shown in FIG. 20, when the input clock CLK is low level (CLK=Low), the control clock $\overline{CLKs}$ is high level and the control clock $\overline{CLKp}$ is low level, the MOS transistors for control M1 and M3 turn on and the MOS transistors for control M2 turns off. That is, the capacitors 1 and 2 are connected in parallel. At this time, aiming at a parasitic PN junction diode Dp accompanying the MOS transistor for control M2, there is a problem that the parasitic PN diode Dp is biased to forward direction.

Drain voltage of the MOS transistor for control M2 is: Vdrain=VA=0V. Source voltage of the MOS transistor for control M2 is: Vsource=VB=−2.5 V. That is, drain potential is higher 2.5 V than substrate potential. Then, a parasitic PN junction diode Dp1 consisting of the drain and the substrate of the MOS transistor for control M2 is biased to forward direction.

That is, the following relation holds: drain voltage Vdrain −substrate voltage Vbody>VF. Here, VF is forward direction threshold voltage of the diode. Thus, needless forward direction current of the diode flows and there has been problems of incorrect movement of the charge-pump circuit and increase of current consumption.

SUMMARY OF THE INVENTION

An object of the invention is to prevent that forward direction current flows substantially through the parasitic PN junction diode accompanying the MOS transistor for control connecting the capacitors in series, to make normal operation of the charge-pump circuit possible and to prevent increase of current consumption at operation of voltage fluctuation of the charge-pump circuit in the charge-pump circuit carrying out voltage fluctuation of lower voltage step than Vdd.

A charge-pump circuit of the invention comprises, at least first and second electrical charge transfer devices connected in series, first and second capacitors, clock supplying means supplying clock to one end of the second capacitor, first switching means for connecting said first and second capacitors to a connecting point of the first and second electrical charge transfer devices in series, and second switching means for connecting said first and second capacitors to the connecting point of the first and second MOS transistors for electrical charge transfer in parallel, wherein at least said first switching means consists of a MOS transistor for control and the charge-pump circuit has means for biasing a substrate of the MOS transistor for control so that forward direction current does not flow substantially through a parasitic diode accompanying the MOS transistor for control.

An operation of a charge-pump circuit is studied in detail. The charge-pump circuit performs voltage fluctuation of lower voltage step than Vdd by connecting capacitors changing alternately in series and in parallel to a pumping node. The charge-pump circuit is fundamentally useful for improving power efficiency of the circuit.

As the result, it is newly found a problem that a parasitic diode accompanying a MOS transistor for control at some step of charge-pump operation is biased to forward direction by constructing the switching means used for such changing with the MOS transistor for control.

Then, the problem is solved by providing means for biasing electrical potential of the substrate of the MOS transistor for control so that forward direction current does not substantially flow through the parasitic diode at all steps of the charge-pump operation.

For such biasing means, suitable modes for carrying out are followings.

First, the MOS transistor for control is P-channel type and the substrate of the MOS transistor for control is biased by voltage of the connecting point of the MOS transistor for control and said first capacitor.

Second, the MOS transistor for control is P-channel type and the substrate of the MOS transistor for control is biased by output of said clock supplying means.

Third, the MOS transistor for control is N-channel type and the substrate of the MOS transistor for control is biased by voltage of the connecting point of the MOS transistor for control and said second capacitor.

Fourth, the MOS transistor for control is N-channel type and the substrate of the MOS transistor for control is biased by voltage of the connecting point of said first and second electric charge transfer devices.

DETAILED DESCRIPTION OF THE PREFERRED EMBODIMENTS

First Embodiment

Figure 1:
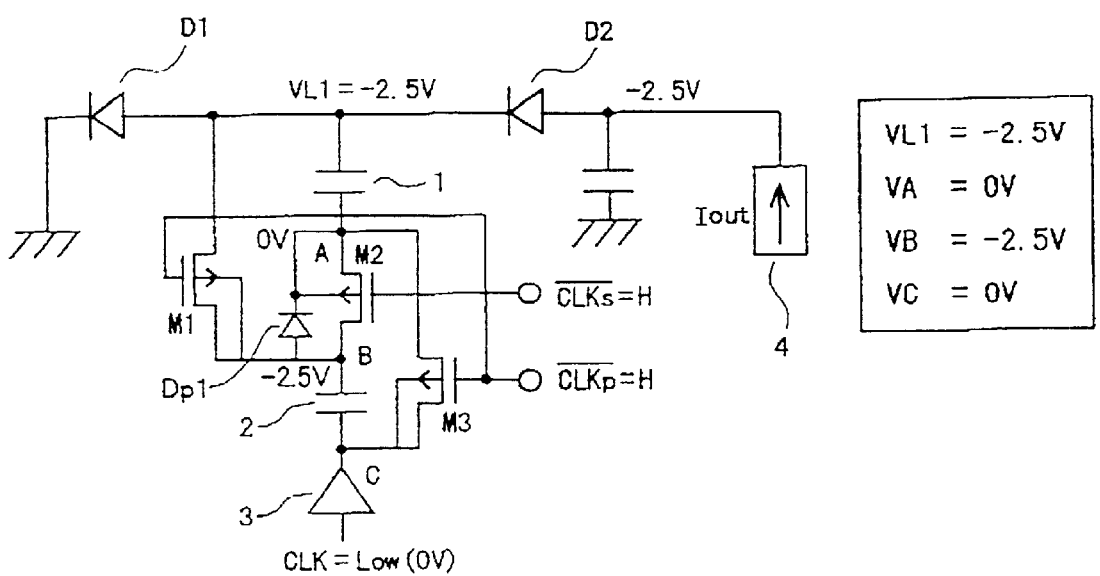
FIG. 1 is a circuit diagram showing a charge-pump circuit and a control method thereof according to a first mode for carrying out of the invention.
Figure 2:
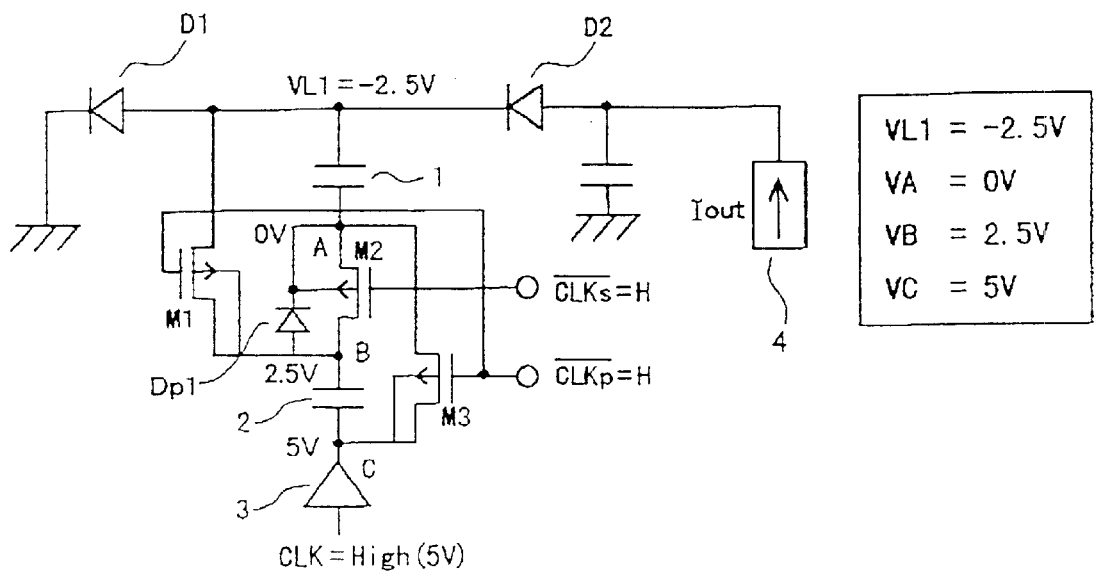
FIG. 2 is a circuit diagram showing a charge-pump circuit and a control method thereof according to the first mode for carrying out of the invention.
Figure 3:
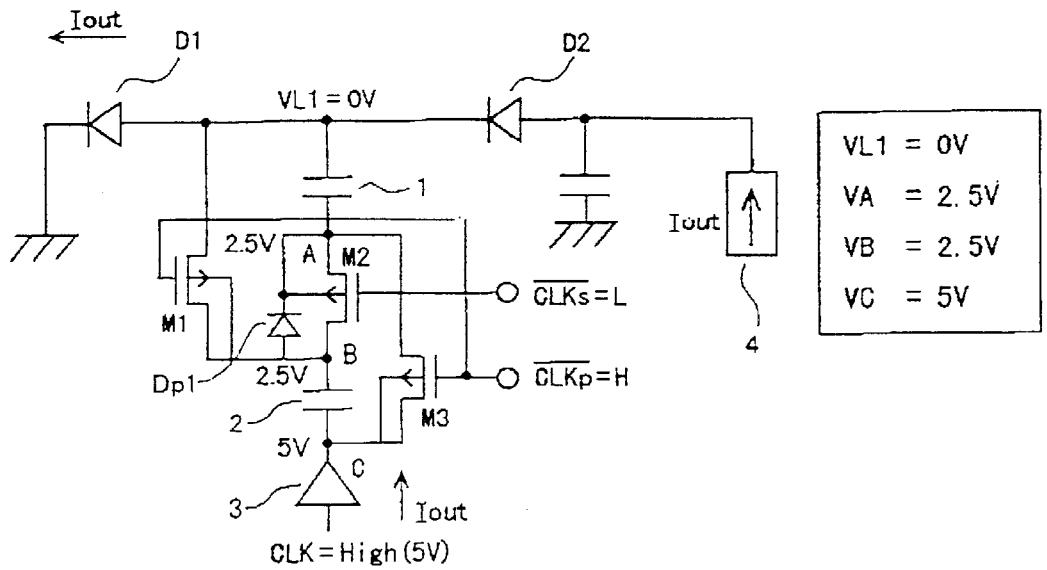
FIG. 3 is a circuit diagram showing a charge-pump circuit and a control method thereof according to the first mode for carrying out of the invention.
Figure 4:
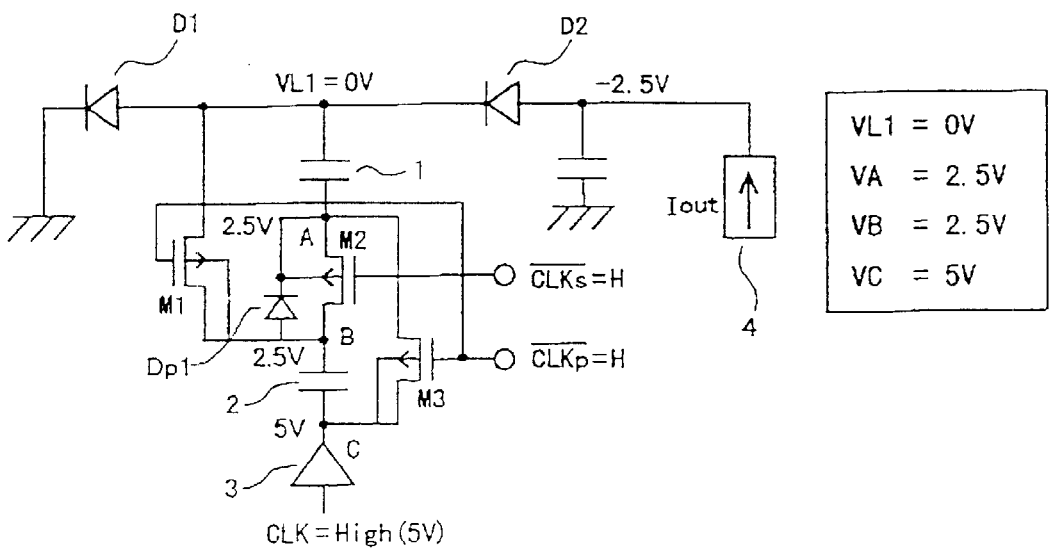
FIG. 4 is a circuit diagram showing a charge-pump circuit and a control method thereof according to the first mode for carrying out of the invention.
Figure 5:
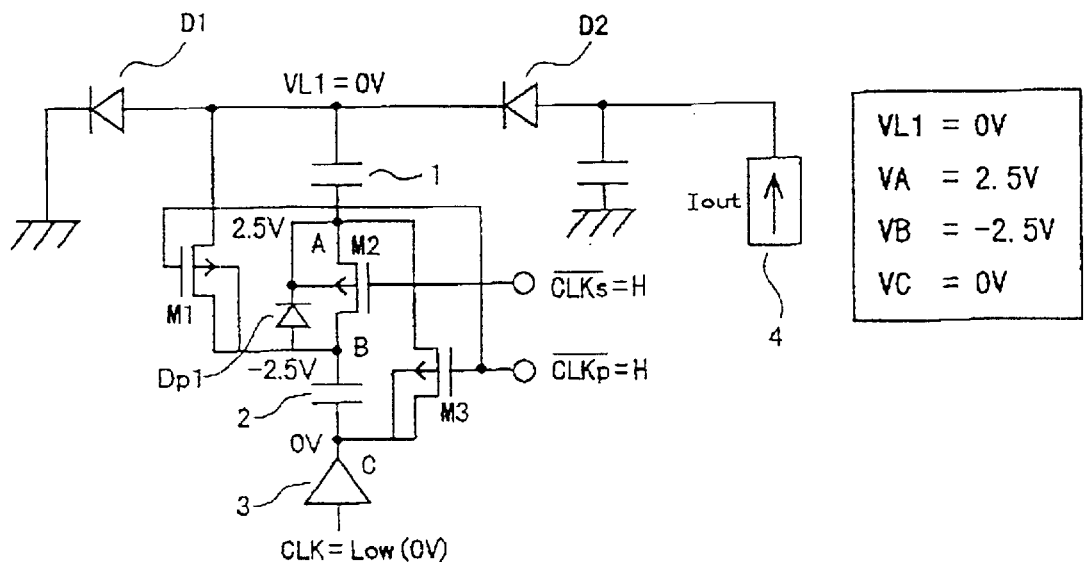
FIG. 5 is a circuit diagram showing a charge-pump circuit and a control method thereof according to the first mode for carrying out of the invention.
Figure 6:
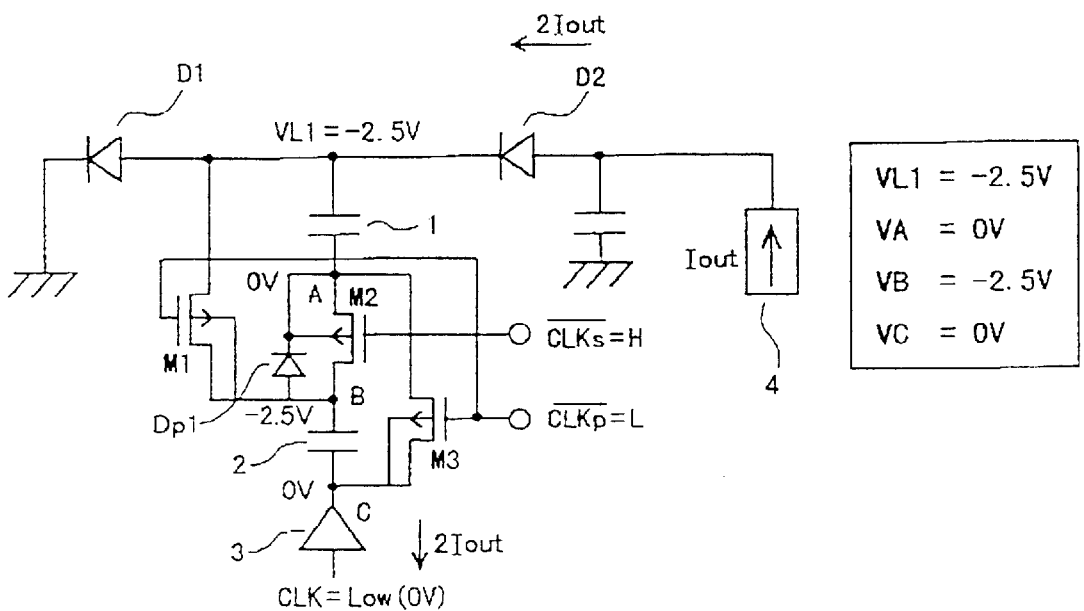
FIG. 6 is a circuit diagram showing a charge-pump circuit and a control method thereof according to the first mode for carrying out of the invention.

A first mode for carrying out of the invention will be described with reference to the drawings.

FIG. 1 to FIG. 6 are circuit diagrams showing constructions of charge-pump circuits outputting voltage fluctuation of −0.5 Vdd. These charge-pump circuits generate voltage fluctuation of −0.5 Vdd to earth voltage (0 V).

Diodes D1 and D2 are connected in series as electric charge transfer devices. In order to integrate into an LSI, the electric charge transfer devices consist of MOS transistors. In the MOS transistors, though it is not limited, for example, a gate and a source are connected as a kind of diode.

MOS transistors for control M1, M2 and M3 connect two capacitors 1 and 2 to a connecting point (pumping node) between the diodes D1 and D2 switching in parallel or in series. In the mode for carrying out, the MOS transistors for control M1, M2 and M3 are P-channel type. Control clock $\overline{\text{CLKs}}$ is applied to a gate of the MOS transistor for control M2. Control clock $\overline{\text{CLKs}}$ is applied to gates of the MOS transistors for control M1 and M3.

That is, when the control clock $\overline{\text{CLKs}}$ is low level and the transistor M2 (first switching means) turns on, the capacitors 1 and 2 are connected in series. When the control clock $\overline{\text{CLKs}}$ is low level and the transistors M1 and M3 (second switching means) turn on, the capacitors 1 and 2 are connected in parallel.

As described later, the transistor M2 and the transistors M1 and M3 are controlled so as to repeat on and off alternately in outline.

Here, aiming the MOS transistor for control M2, the substrate thereof is connected to a connecting point ("A" point in the figure) between the capacitor 1 and the MOS transistor for control M2. Then, the substrate is biased by voltage of the connecting point between the capacitor 1 and the MOS transistor for control M2. Thus, it is prevented that forward direction current flows substantially through the parasitic PN junction diode Dp1 accompanying the MOS transistor for control M2 as described later.

A clock driver 3 supplies clock CLK to the capacitor 2. The clock driver 3, though it is not especially limited, consists of a CMOS inverter to which power source voltage Vdd is supplied. Output voltage output from a diode D2 is applied to a load 4.

Figure 7:
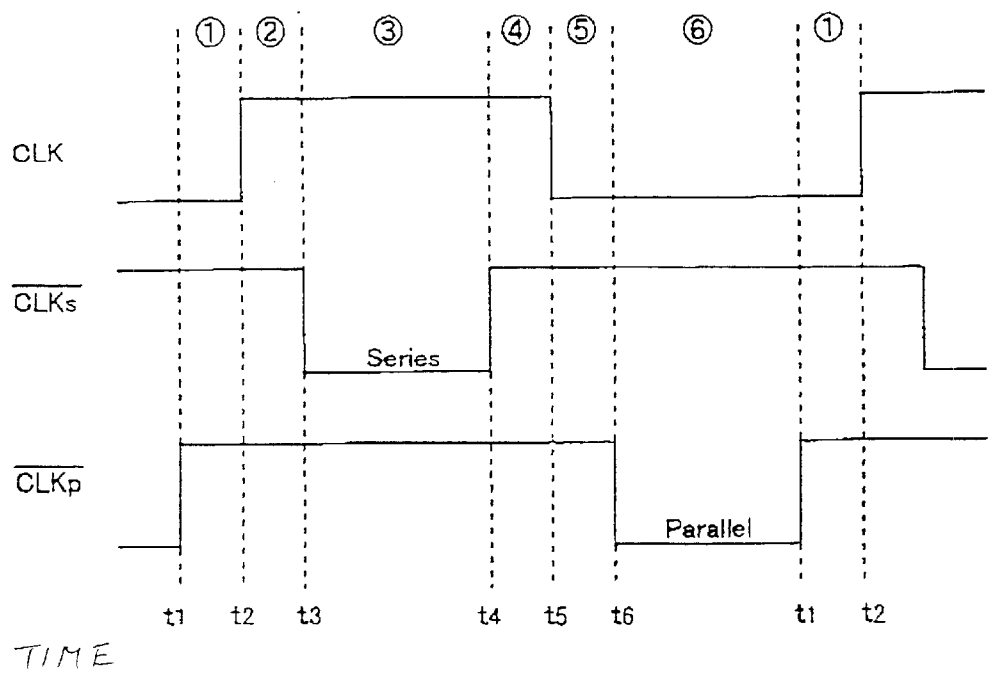
FIG. 7 is a timing chart showing a charge-pump circuit and a control method thereof according to the first mode for carrying out of the invention.

A control method of the charge-pump circuit having the above-mentioned construction will be described referring FIG. 1 to FIG. 7. FIG. 7 is a timing chart for describing control method of a charge-pump circuit.

Although it is not limited, it is assumed that power source voltage Vdd of the clock driver 3 is 5 V and capacitor values of the capacitors 1 and 2 are equal. Voltage fall caused by the diode for electric charge transfer D1 and D2 and the MOS transistors M1, M2 and M3 is described as 0 V.

(1) First Control Step

At time t1, the MOS transistors M1 and M3 are off, and all of the MOS transistors M1, M2 and M3 become off state. Input clock CLK of the clock driver 3 is low level (CLK= Low). That is, it is in the state of ① in FIG. 7. At this state, each node voltage is: VL1≈−2.5V, VA=0V, VB=−2.5V, VC=0V. Therefore, the parasitic PN junction diode Dp1 accompanying the MOS transistor for control M2 is biased to reverse direction.

VL1 is voltage of a connecting node of the diodes D1 and D2 and the capacitor 1 (a pumping node), VA is voltage of a connecting node between the capacitor 1 and the transistor M2, VB is voltage of a connecting node between the transistor M2 and the capacitor 2, and VC is voltage of a connecting node between output of the clock driver 3 and the capacitor 2 (see FIG. 1 and FIG. 7).

(2) Second Control Step

Next, at time t2 in the state that all of the transistors for control M1, M2 and M3 are off, the clock CLK is changed to high level from low level. Then, VC changes to 5V and VB changes to 2.5 V by effect of capacitor coupling. Voltage of the pumping node VL1 does not change because all of the transistors M1, M2 and M3 are off (see FIG. 2 and FIG. 7). That is, it is in the state of ② in FIG. 7.

Although the parasitic PN junction diode Dp1 accompanying the MOS transistor for control M2 is biased to forward direction, the node A in the figure becomes floating state because the transistors M2 and M3 are off. Therefore, forward direction current does not flow substantially.

(3) Third Control Step

After that, at time t3 in the state that input clock of the clock driver 3 maintains high level (CLK=High), the transistor for control M2 is changed to on. Thus, two capacitors 1 and 2 are connected in series to the pumping node.

Thus, the capacitors 1 and 2 are charged to voltage of Vdd/2, and each node voltage is: VL1≈0V, VA=VB=2.5V, VC=5V. That is, average output current Iout flows through the MOS transistor M1 and further flows from output of the clock driver 3 (see FIG. 3 and FIG. 7). That is, it is in the state of ③ in FIG. 7. Since voltage difference of the both ends of the parasitic PN junction diode Dp1 accompanying the MOS transistor for control M2 becomes 0 V, forward direction current does not flow.

(4) Fourth Control Step

Next, at time t4 in the state the clock CLK is high, the transistor for control M2 is turned off. Thus, all of the transistors M1, M2 and M3 become again off. Voltage of each node is maintained in the state (see FIG. 4 and FIG. 7). That is, it is in the state of ④ in FIG. 7. Since voltage difference of the both ends of the parasitic PN junction diode Dp1 accompanying the MOS transistor for control M2 is maintained 0 V, forward direction current does not flow.

(5) Fifth Control Step

Next, at time t5 in the state that all of the transistors M1, M2 and M3 are off, input clock CLK is changed to low level (CLK=Low). Then, by effect of capacitor coupling, each node voltage is: VL1≈0V, VA=2.5V, VB=−2.5V, VC=0V (see FIG. 5 and FIG. 7). That is, it is in the state of ⑤ in FIG. 7. Therefore, since of the parasitic PN junction diode Dp1 accompanying the MOS transistor for control M2 is biased to reverse direction, forward direction current does not flow.

(6) Sixth Control Step

Next, at time t6 in the state that input clock CLK is maintained low level, the transistors M1 and M3 are turned on. Thus, the capacitors 1 and 2 are connected in parallel to the pumping node. Therefore, each node voltage is: VL1≈− 2.5V, VA=0V, VB=−2.5V, VC=0V (see FIG. 6 and FIG. 7). That is, it is in the state of ⑥ in FIG. 7. Therefore, since of the parasitic PN junction diode Dp1 accompanying the MOS transistor for control M2 is biased to reverse direction in this control step, forward direction current does not flow.

After that, returning to the above-mentioned first control step, the first to sixth steps are repeated. Thus, voltage of −2.5 V is stably obtained from the diode D2.

According to the above-mentioned control method, since it is prevented that forward direction current flows substantially to forward direction through the parasitic PN junction diode Dp1 accompanying the MOS transistor for control M2 in all steps of the circuit operation, charge-pump operation is normally carried out and increase of current consumption caused by flow of needless current is prevented.

Second Embodiment

Next, a second mode for carrying out of the invention will be described with reference to the drawings.

FIG. 8 to FIG. 13 are circuit diagrams showing constructions of charge-pump circuits outputting voltage fluctuation of −0.5 Vdd. These charge-pump circuits generate voltage fluctuation of −0.5 Vdd to earth voltage (0 V) similarly as the circuit of the first mode for carrying out.

The mode for carrying out differs from the first mode for carrying out at the point that the MOS transistors M1, M2 and M3 consist of N-channel type. Control clock CLKs is applied to a gate of the MOS transistor for control M2. Control clock CLKp is applied to gates of the MOS transistors for control M1 and M3.

That is, when the control clock CLKs is high level and the transistor M2 (first switching means) turns on, the capacitors 1 and 2 are connected in series. When the control clock CLKp is high level and the transistors M1 and M3 (second switching means) turn on, the capacitors 1 and 2 are connected in parallel.

As described later, the transistor M2 and the transistors M1 and M3 are controlled so as to repeat on and off alternately in outline.

Here, aiming the MOS transistor for control M2, the substrate thereof is connected to a connecting point (B point in the figure) between the capacitor 2 and the MOS transistor for control M2. Then, the substrate is biased by voltage of the connecting point between the capacitor 2 and the MOS transistor for control M2. Thus, it is prevented that forward direction current flows substantially through the parasitic PN junction diode Dp2 accompanying the MOS transistor for control M2 as described later.

Figure 14:
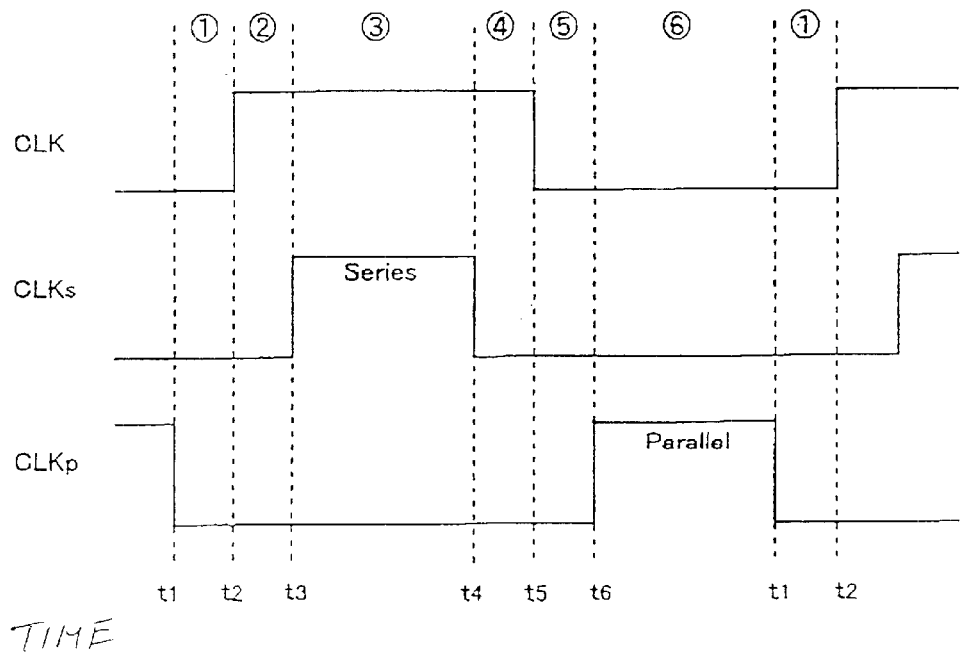
FIG. 14 is a timing chart showing a charge-pump circuit and a control method thereof according to the second mode for carrying out of the invention.

A control method of the charge-pump circuit having the above-mentioned construction will be described referring FIG. 8 to FIG. 14. FIG. 14 is a timing chart for describing control method of a charge-pump circuit.

Although it is not limited, it is assumed that power source voltage Vdd of the clock driver 3 is 5 V and capacitor values of the capacitors 1 and 2 are equal. Voltage fall caused by the diode for electric charge transfer D1 and D2 and the MOS transistors M1, M2 and M3 is described as 0 V.

(1) First Control Step

At time t1, since the MOS transistors for control M1 and M3 are turned off, all of the M1, M2 and M3 become off state. Input clock CLK of the clock driver 3 is low level (CLK=Low) That is, it is in the state of ① in FIG. 14. At this state, each node voltage is: VL1≈−2.5V, VA=0V, VB=−2.5V, VC=0V. Therefore, the parasitic PN junction diode Dp2 accompanying the MOS transistor for control M2 is biased to reverse direction.

Figure 8:
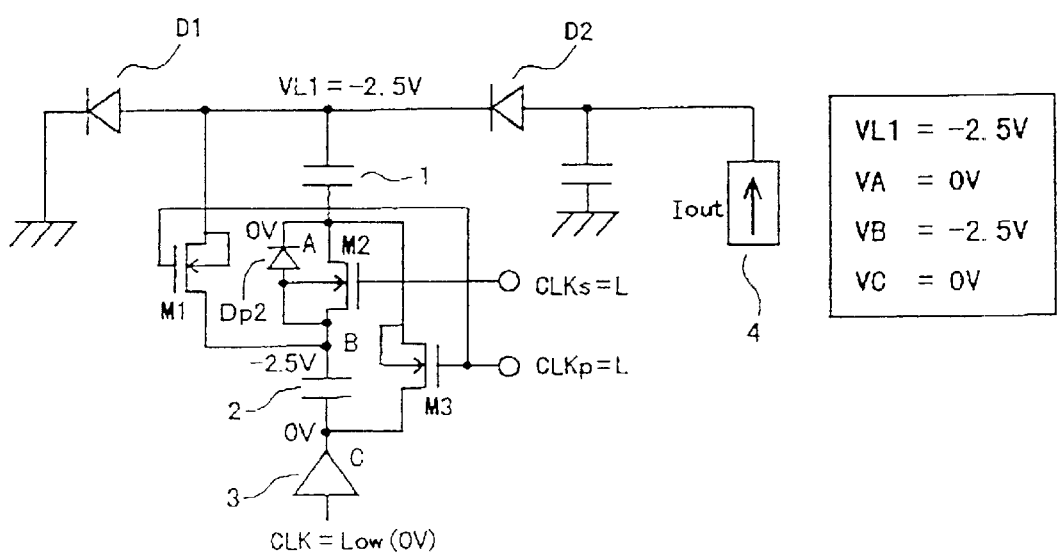
FIG. 8 is a circuit diagram showing a charge-pump circuit and a control method thereof according to a second mode for carrying out of the invention.
Figure 9:
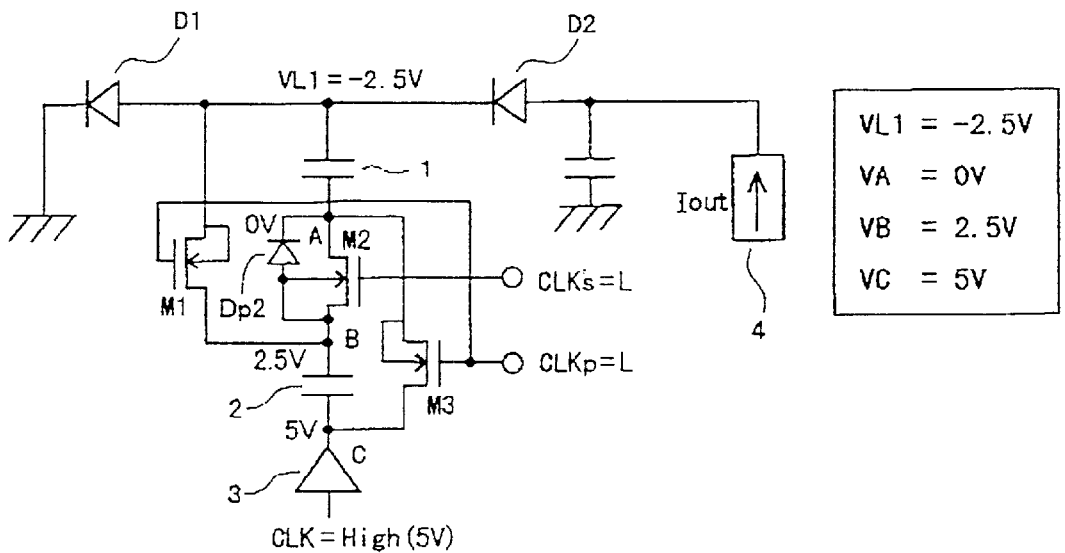
FIG. 9 is a circuit diagram showing a charge-pump circuit and a control method thereof according to the second mode for carrying out of the invention.
Figure 10:
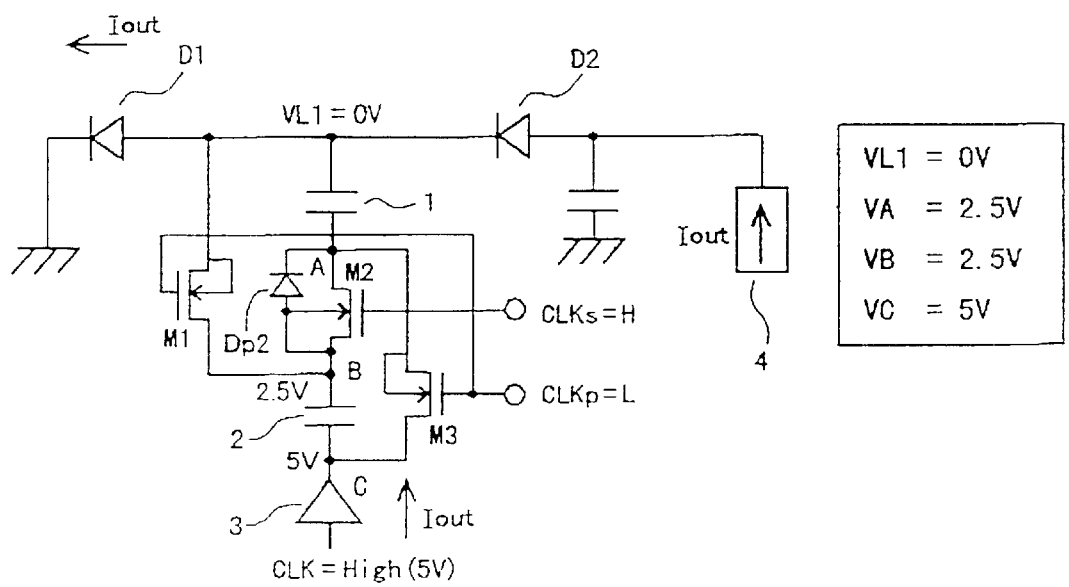
FIG. 10 is a circuit diagram showing a charge-pump circuit and a control method thereof according to the second mode for carrying out of the invention.
Figure 11:
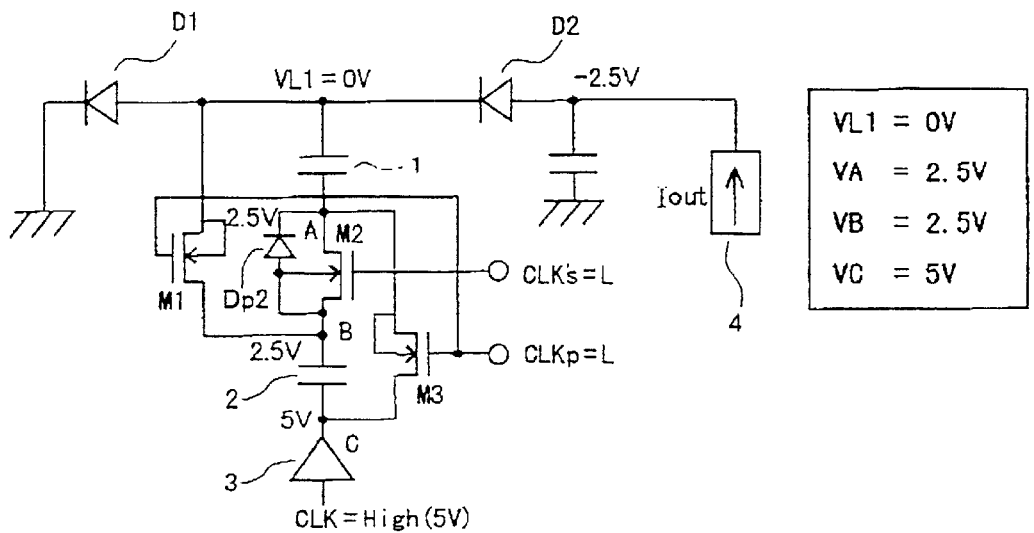
FIG. 11 is a circuit diagram showing a charge-pump circuit and a control method thereof according to the second mode for carrying out of the invention.
Figure 12:
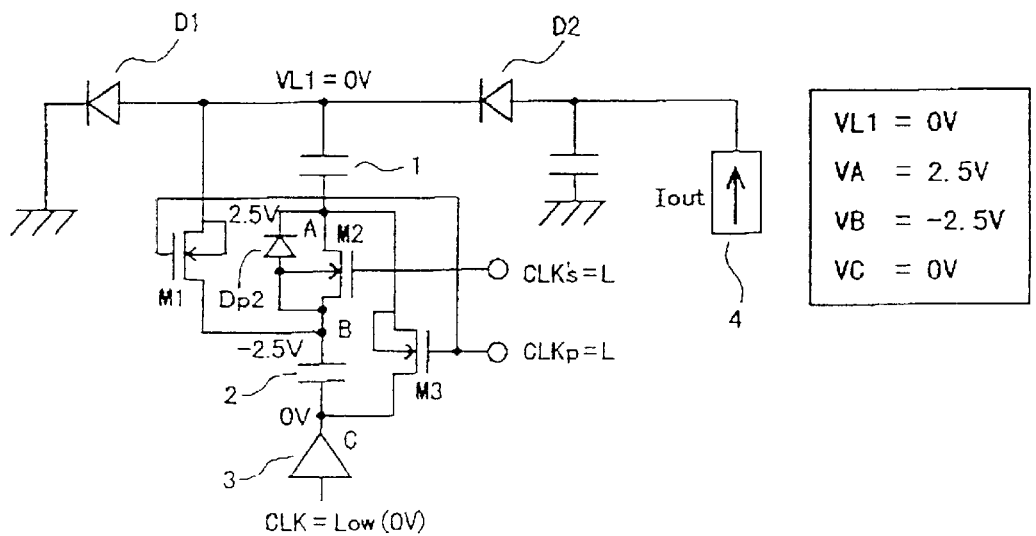
FIG. 12 is a circuit diagram showing a charge-pump circuit and a control method thereof according to the second mode for carrying out of the invention.
Figure 13:
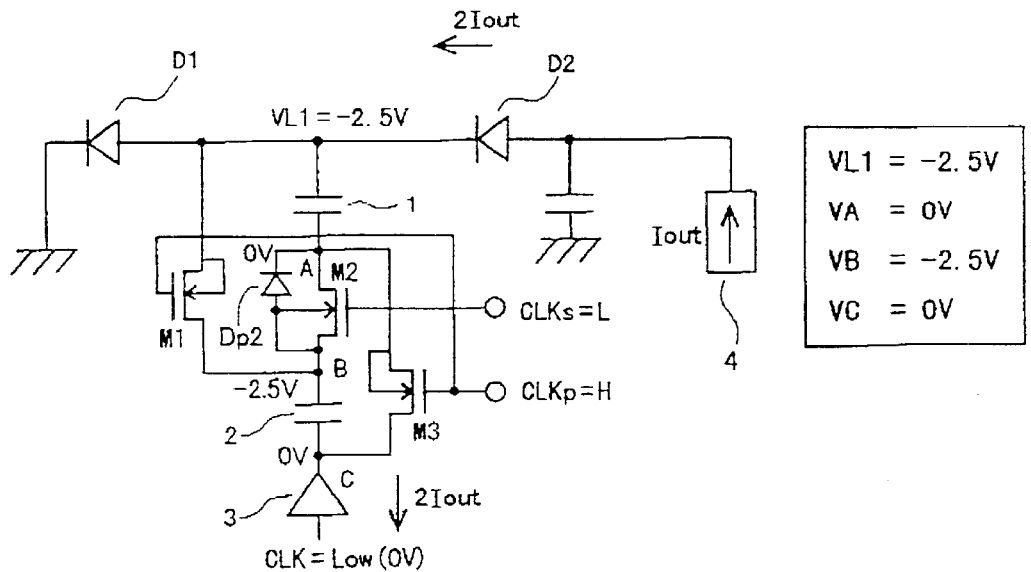
FIG. 13 is a circuit diagram showing a charge-pump circuit and a control method thereof according to the second mode for carrying out of the invention.

VL1 is voltage of a connecting node of the diodes D1 and D2 and the capacitor 1 (a pumping node), VA is voltage of a connecting node between the capacitor 1 and the transistor M2, VB is voltage of a connecting node between the transistor M2 and the capacitor 2, and VC is voltage of a connecting node between output of the clock driver 3 and the capacitor 2 (see FIG. 8 and FIG. 14).

(2) Second Control Step

Next, at time t2 in the state that all of the transistors for control M1, M2 and M3 are off, the clock CLK is changed to high level from low level. Then, VC changes to 5V and VB changes to 2.5 V by effect of capacitor coupling. Voltage of the pumping node VL1 does not change because all of the transistors M1, M2 and M3 are off (see FIG. 9 and FIG. 14). That is, it is in the state of ② in FIG. 14.

Although the parasitic PN junction diode Dp2 accompanying the MOS transistor for control M2 is biased to forward direction, the node A in the figure becomes floating state because the transistors M2 and M3 are off. Therefore, forward direction current does not flow substantially.

(3) Third Control Step

After that, at time t3 in the state that input clock of the clock driver 3 maintains high level (CLK=High), the transistor for control M2 is changed to on. Thus, two capacitors 1 and 2 are connected in series to the pumping node.

Thus, the capacitors 1 and 2 are charged to voltage of Vdd/2, and each node voltage is: VL1≈−0V, VA=VB=2.5V, VC=5V. That is, average output current Iout flows through the MOS transistor M1 and further flows from output of the clock driver 3 (see FIG. 10 and FIG. 14). That is, it is in the state of ③ in FIG. 14. Since voltage difference of the both ends of the parasitic PN junction diode Dp2 accompanying the MOS transistor for control M2 becomes 0 V, forward direction current does not flow.

(4) Fourth Control Step

Next, at time t4 in the state the clock CLK is high, the transistor for control M2 is turned off. Thus, all of the transistors M1, M2 and M3 become again off. Voltage of each node is maintained in the state (see FIG. 11 and FIG. 14). That is, it is in the state of ④ in FIG. 14. Since voltage difference of the both ends of the parasitic PN junction diode Dp2 accompanying the MOS transistor for control M2 is maintained 0 V, forward direction current does not flow.

(5) Fifth Control Step

Next, at time t5 in the state that all of the transistors M1, M2 and M3 are off, input clock CLK is changed to low level (CLK=Low). Then, by effect of capacitor coupling, each node voltage is: VL1≈0V, VA=2.5V, VB=−2.5V, VC=0V (see FIG. 12 and FIG. 14). That is, it is in the state of ⑤ in FIG. 7. Therefore, since of the parasitic PN junction diode Dp2 accompanying the MOS transistor for control M2 is biased to reverse direction, forward direction current does not flow.

(6) Sixth Control Step

Next, at time t6 in the state that input clock CLK is maintained low level, the transistors M1 and M3 are turned on. Thus, the capacitors 1 and 2 are connected in parallel to the pumping node. Therefore, each node voltage is: VL1≈−2.5V, VA=0V, VB=−2.5V, VC=0V (see FIG. 13 and FIG. 14). That is, it is in the state of ⑥ in FIG. 14. Therefore, since of the parasitic PN junction diode Dp2 accompanying the MOS transistor for control M2 is biased to reverse direction in this control step, forward direction current does not flow.

After that, returning to the above-mentioned first control step, the first to sixth steps are repeated. Thus, voltage of −2.5 V is stably obtained from the diode D2.

According to the above-mentioned control method, since it is prevented that forward direction current flows substantially to forward direction through the parasitic PN junction diode Dp2 accompanying the MOS transistor for control M2 in all steps of the circuit operation, charge-pump operation is normally carried out and increase of current consumption caused by flow of needless current is prevented.

Third Embodiment

Next, a third mode for carrying out of the invention will be described with reference to the drawing.

Figure 15:
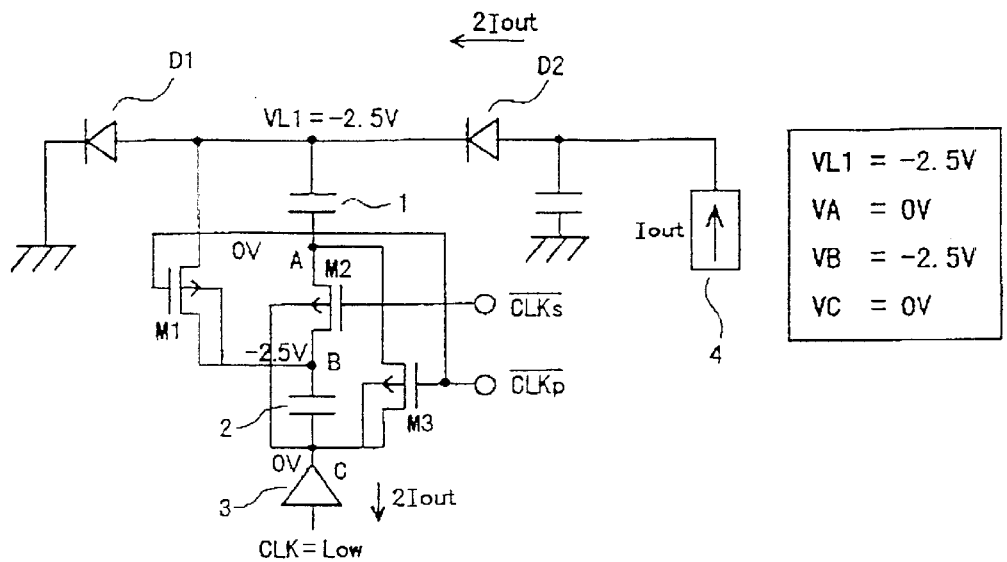
FIG. 15 is a circuit diagram showing a charge-pump circuit and a control method thereof according to a third mode for carrying out of the invention.

FIG. 15 is a circuit diagram showing a construction of a charge-pump circuit outputting voltage fluctuation of −0.5 Vdd. This charge-pump circuit generates voltage fluctuation of −0.5 Vdd to earth voltage (0 V) similarly as the circuit of the first mode for carrying out.

In the mode for carrying out, the MOS transistors for control M1, M2 and M3 consist of P-channel type similarly as the first mode for carrying out. Control clock $\overline{CLKs}$ is applied to a gate of the MOS transistor for control M2. Control clock $\overline{CLKp}$ is applied to gates of the MOS transistors for control M1 and M3.

That is, when the control clock $\overline{CLKs}$ is low level and the transistor M2 (first switching means) turns on, the capacitors 1 and 2 are connected in series. When the control clock $\overline{CLKp}$ is low level and the transistors M1 and M3 (second switching means) turn on, the capacitors 1 and 2 are connected in parallel.

Here, aiming the MOS transistor for control M2, the substrate thereof is connected to the capacitor 2 and output of the clock driver 3 (C point in the figure). It is the characteristic of the mode for carrying out. Then, the substrate is biased by output voltage of the clock driver 3. Thus, it is prevented that forward direction current flows substantially through the parasitic PN junction diode accompanying the MOS transistor for control M2 similarly as the first mode for carrying out.

Since control method of the charge-pump circuit of the mode for carrying out is similar as the first mode for carrying out, the description is omitted.

Fourth Embodiment

Next, a fourth mode for carrying out of the invention will be described with reference to the drawing.

Figure 16:
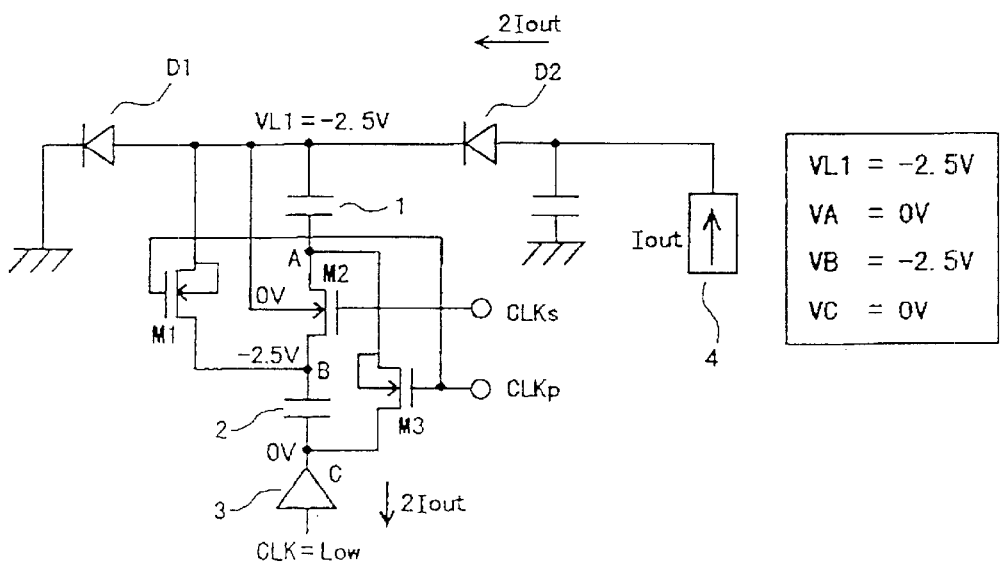
FIG. 16 is a circuit diagram showing a charge-pump circuit and a control method thereof according to a fourth mode for carrying out of the invention.
Figure 17:
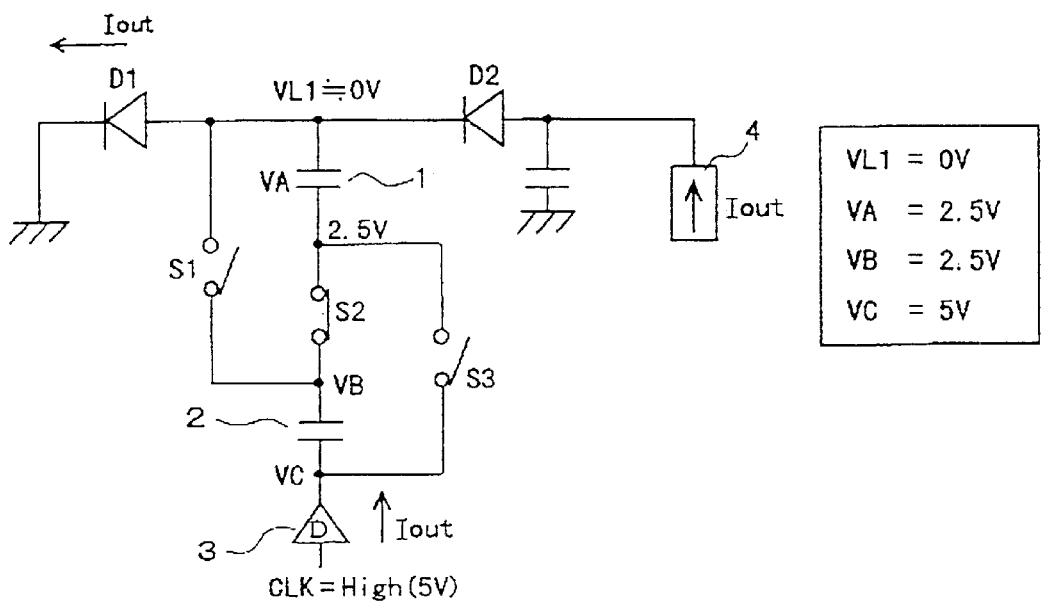
FIG. 17 is the circuit diagram showing the conventional charge-pump circuit and the control method.
Figure 18:
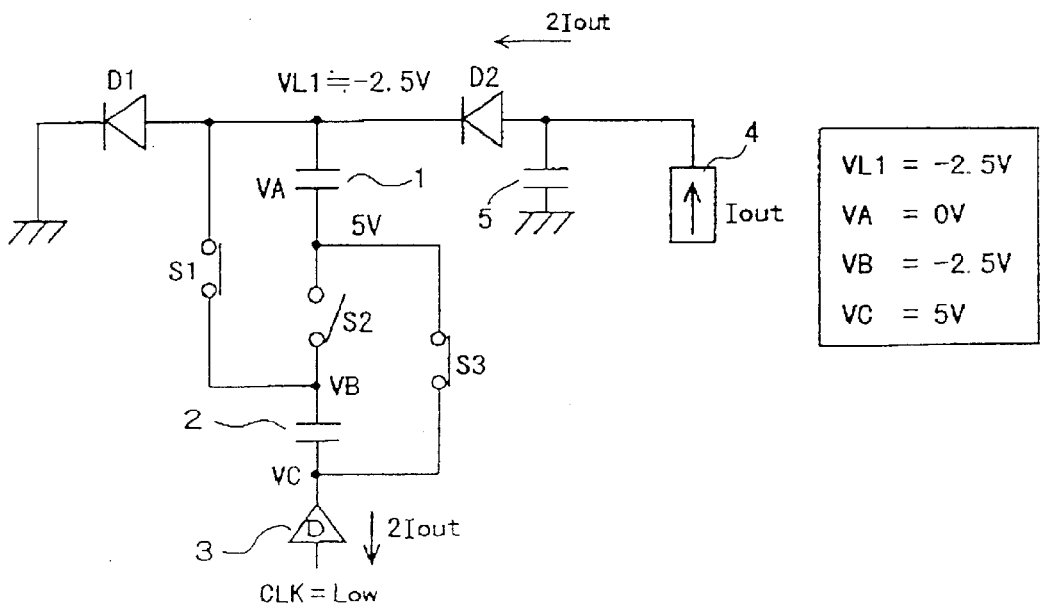
FIG. 18 is the circuit diagram showing the conventional charge-pump circuit and the control method.
Figure 19:
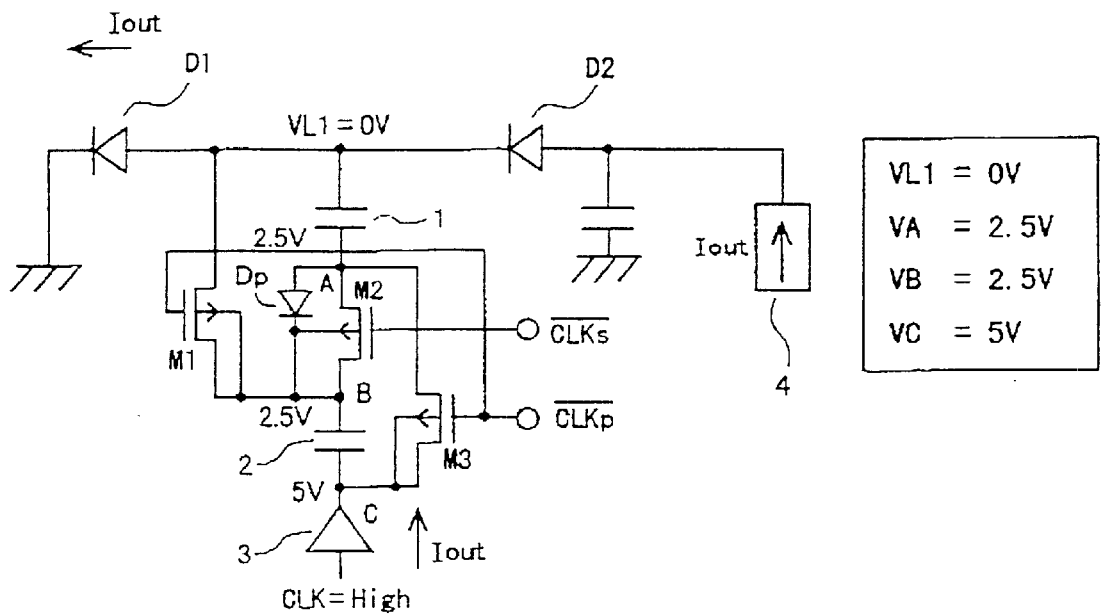
FIG. 19 is the circuit diagram showing the conventional charge-pump circuit and the control method.
Figure 20:
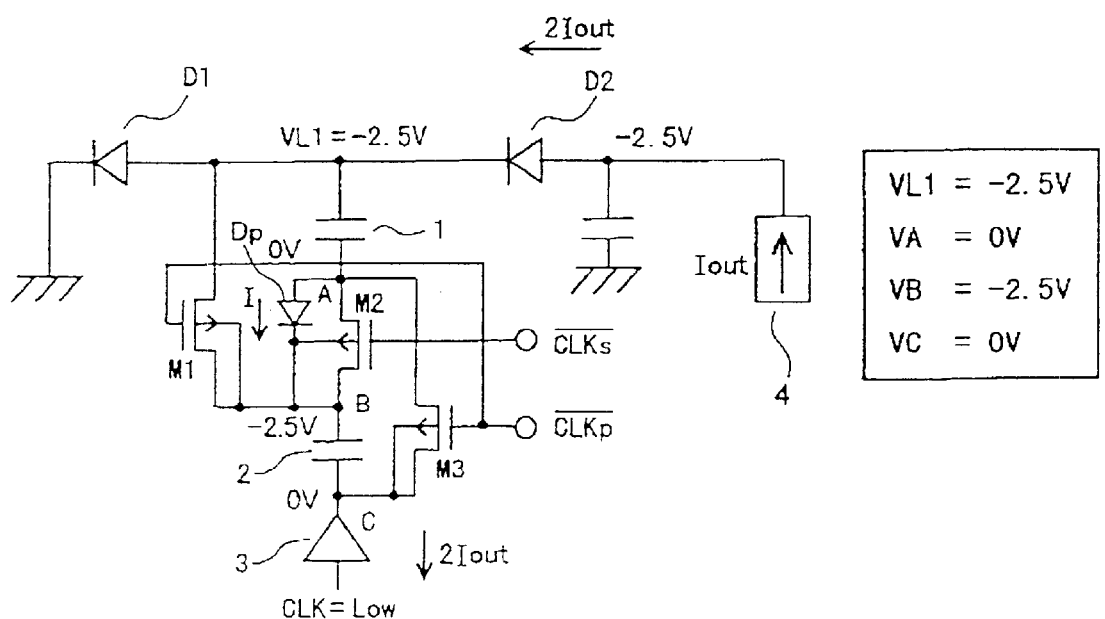
FIG. 20 is the circuit diagram showing the conventional charge-pump circuit and the control method.

FIG. 16 is a circuit diagram showing a construction of a charge-pump circuit outputting voltage fluctuation of −0.5 Vdd. This charge-pump circuit generates voltage fluctuation of −0.5 Vdd to earth voltage (0 V) similarly as the circuit of the first mode for carrying out.

In the mode for carrying out, similarly as the second mode for carrying out, the MOS transistors M1, M2 and M3 consist of N-channel type. Control clock CLKs is applied to a gate of the MOS transistor for control M2. Control clock CLKp is applied to gates of the MOS transistors for control M1 and M3.

That is, when the control clock CLKs is high level and the transistor M2 (first switching means) turns on, the capacitors 1 and 2 are connected in series. When the control clock CLKp is high level and the transistors M1 and M3 (second switching means) turn on, the capacitors 1 and 2 are connected in parallel.

Here, aiming the MOS transistor for control M2, the substrate thereof is connected to a connecting point between diodes for electric charge transfer D1 and D2 (pumping node). It is characteristic of the mode for carrying out. Then, the substrate is biased by voltage of the pumping node. Thus, it is prevented that forward direction current flows substantially through the parasitic PN junction diode accompanying the MOS transistor for control M2.

Since control method of the charge-pump circuit of the mode for carrying out is similar as the second mode for carrying out, the description is omitted.

Although all of the MOS transistors for control M1, M2 and M3 are formed with the same channel type (N-channel or P-channel) in the above-mentioned first to fourth modes for carrying out, it is not limited to this, it is within the invention N-channel and P-channel are mixed. For example, it is possible that the transistor M2 consists of P-channel and the transistors M1 and M3 consist of N-channel.

In the case that the MOS transistors for electric charge transfer M1 and M2 are diode-connected instead of the diodes D1 and D2, voltage loss equal to threshold voltage of the MOS transistors generates. The invention is not limited to this and is applied for a charge-pump circuit in which the MOS transistors for electric charge transfer M1 and M2 are made on and off alternately in response to the clock CLK and fluctuated voltage (for example, 2 Vdd in absolute value) is supplied to gates thereof when the MOS transistors for electric charge transfer M1 and M2 are turned on.

In this case, these gate voltages are controlled so that M1 is on and M2 is off during the capacitors 1 and 2 are connected in series and M1 is off and M2 is on during the capacitors 1 and 2 are connected in parallel.

Thus, threshold voltage loss of the MOS transistors M1 and 2 are removed, and a charge-pump circuit with high efficiency and large output current is realized because on resistances of the MOS transistors M1 and M2 are decreased.

The MOS transistors for electric charge transfer may consist of any of P-channel MOS transistor and N-channel MOS transistor.

Although an applied example for one stage charge-pump circuit outputting fluctuated voltage of −0.5 Vdd is shown, it is applicable to a two stages charge-pump circuit outputting fluctuated voltage of −1.5 Vdd by increasing number of stage of the charge-pump in the invention.

Generally, the invention is applicable to a multi-stages charge-pump circuit assembling the charge-pump circuit of the embodiment as a core. Such the multi-stages charge-pump circuit outputs voltage of −0.5 Vdd at the first stage, and at the second stage or more, the circuit is a general Dicson type charge-pump circuit.

Although the charge-pump circuit of the each mode for carrying out is a type carrying out voltage fluctuation of voltage step of −0.5 Vdd changing to two capacitors 1 and 2 to series and parallel, voltage fluctuation of further lower voltage step can be carried out by changing two or more capacitors to series and parallel. The invention is applicable to such the charge-pump circuit.

Although the charge-pump circuit outputting fluctuated voltage of minus is described in the embodiment, the invention is applicable similarly to a charge-pump circuit having a step of +0.5 Vdd.

According to the charge-pump circuit and the control method thereof according to the invention, since it is prevented that the parasitic diode accompanying the MOS transistor for control is biased to forward direction in the charge-pump circuit carrying out voltage fluctuation with lower voltage step than power source voltage by repeating connecting the capacitor to the pumping node in series and in parallel, the invention has effect carrying out normally such the charge-pump operation and preventing increase of current consumption.

Thereby, it is possible to integrate a charge-pump circuit on a single chip.

What is claimed is:

1. A charge-pump circuit comprising:
   at least first and second electrical charge transfer devices connected in series;
   first and second capacitors;
   clock supplying means supplying clock to one end of the second capacitor;
   first switching means for connecting said first and second capacitors to a connecting point of the first and second electrical charge transfer devices in series; and
   second switching means for connecting said first and second capacitors to the connecting point of the first and second electrical charge transfer device in parallel,
   wherein at least said first switching means consists of a MOS transistor for control and the charge-pump circuit has means for biasing a substrate of the MOS transistor for control so that forward direction current does not flow substantially through a parasitic diode accompanying the MOS transistor for control.

2. A charge-pump circuit according to claim 1, wherein said MOS transistor for control is P-channel type and the substrate of the MOS transistor for control is biased by voltage of the connecting point of the MOS transistor for control and said first capacitor.

3. A charge-pump circuit according to claim 1, wherein said MOS transistor for control is P-channel type and the substrate of the MOS transistor for control is biased by output of said clock supplying means.

4. A charge-pump circuit according to claim 1, wherein said MOS transistor for control is N-channel type and the substrate of the MOS transistor for control is biased by voltage of the connecting point of the MOS transistor for control and said second capacitor.

5. A charge-pump circuit according to claim 1, wherein said MOS transistor for control is N-channel type and the substrate of the MOS transistor for control is biased by voltage of the connecting point of said first and second electric charge transfer devices.

6. A charge-pump circuit according to any of claim 1 to claim 5, wherein each of said electrical charge transfer device consists of a MOS transistor for electrical charge transfer.

7. A method for controlling of charge-pump circuit comprising the step of: at least first and second electrical charge transfer devices connected in series; first and second capacitors; clock supplying means supplying clock to one end of the second capacitor; first switching means for connecting said first and second capacitors to a connecting point of the first and second electrical charge transfer devices in series; and second switching means for connecting said first and second capacitors to the connecting point of the first and second electrical charge transfer device in parallel, in which at least said first switching means consists of a MOS transistor for control and the charge-pump circuit has means for biasing a substrate of the MOS transistor for control so that forward direction current does not flow substantially through a parasitic diode accompanying the MOS transistor for electrical charge transfer, said method for controlling further comprising a step of changing state of said clock by said clock supplying means after said first and second switching means turn off.

8. A method for controlling of charge-pump circuit according to claim 7, further comprising steps of:
   a first step turning said first and second switching means off;
   a second step changing said clock to a second state from a first state by said clock supplying means;
   a third step connecting said first and second capacitors in series by turning said first switching means on;
   a fourth step turning said first switching means off;
   a fifth step changing said clock to the first state from the second state by said clock supplying means; and
   a sixth step connecting said first and second capacitors in parallel by turning said second switching means on,
   wherein said first to sixth steps are repeated.

* * * * *